US011410030B2

(12) United States Patent
Qiao et al.

(10) Patent No.: US 11,410,030 B2
(45) Date of Patent: Aug. 9, 2022

(54) ACTIVE IMITATION LEARNING IN HIGH DIMENSIONAL CONTINUOUS ENVIRONMENTS

(71) Applicant: International Business Machines Corporation, Armonk, NY (US)

(72) Inventors: Mu Qiao, Belmont, CA (US); Dylan J. Fitzpatrick, Pittsburgh, PA (US); Divyesh Jadav, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 16/124,138

(22) Filed: Sep. 6, 2018

(65) Prior Publication Data

US 2020/0082257 A1  Mar. 12, 2020

(51) Int. Cl.
*G06N 3/08* (2006.01)
*G06N 3/04* (2006.01)

(52) U.S. Cl.
CPC ............ *G06N 3/08* (2013.01); *G06N 3/0472* (2013.01)

(58) Field of Classification Search
CPC ............................... G06N 3/08; G06N 3/0472
See application file for complete search history.

(56) References Cited

U.S. PATENT DOCUMENTS

| 6,581,048 | B1 | 6/2003 | Werbos |
| 7,797,266 | B2 | 9/2010 | Mizuno et al. |
| 8,478,642 | B2 | 7/2013 | Dey et al. |
| 8,862,523 | B2 | 10/2014 | Richardson et al. |
| 8,874,498 | B2 | 10/2014 | Modha |
| 2017/0109656 | A1 | 4/2017 | Cook et al. |
| 2019/0332922 | A1* | 10/2019 | Nachum ................ G06N 3/006 |
| 2021/0237266 | A1* | 8/2021 | Kalashnikov .......... B25J 9/1612 |

OTHER PUBLICATIONS

Piot et al. (Bridging the Gap Between Imitation Learning and Inverse Reinforcement Learning, May 2016, pp. 1814-1826) (Year: 2016).*
Abbeel (Apprenticeship Learning via Inverse Reinforcement Learning, 2004, pp. 1-8) (Year: 2004).*
Li et al. (Inferring the Latent Structure of Human Decision-Making from Raw Visual Inputs, Mar. 2017, pp. 1-11) (Year: 2017).*
U.S. Appl. No. 62/685,838, filed Jun. 2018, pp. 1-30 (Year: 2018).*

(Continued)

*Primary Examiner* — George Giroux
(74) *Attorney, Agent, or Firm* — Zilka-Kotab, P.C.

(57) ABSTRACT

According to one embodiment, a computer-implemented method for active, imitation learning, includes: providing training data comprising an expert trajectory to a processor; querying the expert trajectory during an iterative, active learning process; generating a decision policy based at least in part on the expert trajectory and a result of querying the expert trajectory; attempting to distinguish the decision policy from the expert trajectory; in response to distinguishing the decision policy from the expert trajectory, outputting a policy update and generating a new decision policy based at least in part on the policy update; and in response to not distinguishing the decision policy from the expert trajectory, outputting the decision policy. Importantly, the expert trajectory is queried for only a subset of iterations of the iterative, active learning process, wherein the most uncertain state/action pair(s) from the expert trajectory are determined using one or more disagreement functions.

17 Claims, 6 Drawing Sheets

(56) References Cited

OTHER PUBLICATIONS

Chernova et al. (Interactive Policy Learning through Confidence-Based Autonomy, Jan. 2009, pp. 1-25) (Year: 2009).*

Hanczor (Improving Imitation Learning through Efficient Expert Querying, Aug. 2018, pp. 0-34) (Year: 2018).*

Ratliff et al., "Inverse Optimal Heuristic Control for Imitation Learning," 12th International Conference on Artifcial Intelligence and Statistics (AISTATS), 2009, 8 pages.

Cichosz et al., "Imitation Learning of Car Driving Skills with Decision Trees and Random Forests," International Journal of Applied Mathematics and Computer Science, vol. 24, No. 3, 2014, pp. 579-597.

Ho et al., "Generative Adversarial Imitation Learning," 30th Conference on Neural Information Processing Systems (NIPS), 2016, pp. 1-9.

Judah et al., "Active Imitation Learning via Reduction to I.I.D. Active Learning," preprint for UAI, 2012, 10 pages, retrieved from https://arxiv.org/ftp/arxiv/papers/1210/1210.4876.pdf.

Goodfellow et al., "Generative Adversarial Nets," Annual Conference on Neural Information Processing Systems (NIPS), 2014, pp. 1-9, retrieved from https://papers.nips.cc/paper/5423-generative-adversarial-nets.pdf.

Sermanet et al., "Time-Contrastive Networks: Self-Supervised Learning from Multi-View Observation," 2017, pp. 1-14, preprint retrieved from https://arxiv.org/pdf/1704.06888v1.pdf.

Ross et al., "Efficient Reductions for Imitation Learning," 13th International Conference on Artificial Intelligence and Statistics (AISTATS), 2010, pp. 1-8.

Ng et al., "Algorithms for Inverse Reinforcement Learning," 17th International Conference on Machine Learning, 2000, 8 pages, retrieved from http://citeseerx.ist.psu.edu/viewdoc/summary?doi=10.1.1.41.7513.

* cited by examiner

---
Conventional Generative adversarial imitation learning (GAIL)
1: Input: Expert trajectories $\tau_E \sim \pi_E$, initial policy and discriminator parameters $\theta_0, w_0$
2: for $i = 0, 1, 2, \ldots$ do
3:     Sample trajectories $\tau_i \sim \pi_{\theta_i}$
4:     Update the discriminator parameters from $w_i$ to $w_{i+1}$ with the gradient $$\hat{\mathbb{E}}_{\tau_i}[\nabla_w \log(D_w(s,a))] + \hat{\mathbb{E}}_{\tau_E}[\nabla_w \log(1 - D_w(s,a))] \tag{17}$$

5:     Take a policy step from $\theta_i$ to $\theta_{i+1}$, using the TRPO rule with cost function $\log(D_{w_{i+1}}(s,a))$. Specifically, take a KL-constrained natural gradient step with $$\hat{\mathbb{E}}_{\tau_i}[\nabla_\theta \log \pi_\theta(a|s) Q(s,a)] - \lambda \nabla_\theta H(\pi_\theta), \tag{18}$$
$$\text{where } Q(\bar{s}, \bar{a}) = \hat{\mathbb{E}}_{\tau_i}[\log(D_{w_{i+1}}(s,a)) \mid s_0 = \bar{s}, a_0 = \bar{a}]$$

6: end for
---

FIG. 3

---
Algorithm 1 Active-GAIL
Input: Initial set of labeled state-action pairs $L_0$, initial policy and discriminator parameters $\{\theta_0, w_0\}$, number of queries per iteration $n$, query interval $q$, size of unlabeled pool per iteration $K$
Output: Stationary policy $\hat{\pi}$
1: $L = L_0$
2: for $i = 0, 1, 2, \ldots$ do
3:     If $i \bmod q == 0$ then     ▷ Every $q$ iterations, send $n$ queries to expert
4:         $U = \{\}$
5:         while $|U| < K$ do
6:             $S = \text{SimulateTrajectory}(\hat{\pi})$     ▷ States generated on trajectory of $\hat{\pi}$
7:             $U = U \cup S$
8:         end while
9:         for $j = 1, \ldots, n$ do
10:            $s = \text{ActiveLearner}(L, U)$     ▷ Active learner returns next state to query
11:            $L = L \cup \{(s, \text{Label}(s))\}$     ▷ Query expert for label
12:         end for
13:     end if
14:     Sample trajectories $\tau_i \sim \hat{\pi}$
15:     Update the discriminator parameters from $w_i$ to $w_{i+1}$ with the gradient $$\hat{\mathbb{E}}_{\tau_i}[\nabla_w \log(D_w(s,a))] + \hat{\mathbb{E}}_{\tau_E}[\nabla_w \log(1 - D_w(s,a))] \tag{1}$$

16:     Take a policy step from $\theta_i$ to $\theta_{i+1}$, using the TRPO rule with cost function $\log(D_{w_{i+1}}(s,a))$. Specifically, take a KL-constrained natural gradient step with $$\hat{\mathbb{E}}_{\tau_i}[\nabla_\theta \log \pi_\theta(a|s) Q(s,a)] - \lambda \nabla_\theta H(\pi_\theta) \tag{2}$$
$$\text{where } Q(\bar{s}, \bar{a}) = \hat{\mathbb{E}}_{\tau_i}[\log(D_{w_{i+1}}(s,a)) | s_0 = \bar{s}, a_0 = \bar{a}]$$

17:     $\hat{\pi} = \pi_{\theta_i}$
18: end for
19: return $\hat{\pi}$
---

FIG. 4

Algorithm 1-1
function DENSITYWEIGHTEDQUERYBYCOMMITTEE($L, U, T$)     ▷ Active Learner
  $C = \{\}$
  for $i = 1, \ldots, T$ do     ▷ Build a committee of $T$ bagged decision trees
    $L' = \text{BootstrapSample}(L)$
    $c = \text{LearnDecisionTree}(L')$
    $C = C \cup c$
  end for
  $\hat{d}_U = \text{EstimateDensity}(U)$     ▷ Estimate density of states in $U$
  $s^* = \text{argmax}_{s \in U} \, \hat{d}_U(s) \cdot \text{Disagreement}(s, C)$     ▷ Select state with high disagreement and high density
  return $s^*$
end function

FIG. 5A

Algorithm 1-2
function VOTEENTROPY($s, C$)     ▷ Disagreement function for classification (discrete action space)
  return $-\sum_i \left[ \frac{V(y_i)}{|C|} \log \frac{V(y_i)}{|C|} \right]$     ▷ where $V(y_i)$ is the number of votes for label $y_i$
end function

FIG. 5B

<u>Algorithm 1-3</u>
Disagreement function for multi-output regression (continuous action space with $D_y$ dimensions):

function AverageCoefficientOfVariation($s$, $\mathcal{O}$)
  return $\frac{1}{D_y} \sum_{i=0}^{D_y} \frac{\sigma^{(i)}}{|\mu^{(i)}|}$   ▷ Normalized measure of variance in committee predictions
                                                                                  ▷ averaged across output dimensions
end function where $(\mu^{(i)}, \sigma^{(i)})$ are the mean and s.t.d. of output dimension $i$ across models in $\mathcal{C}$ applied to point $s$.

FIG. 5C

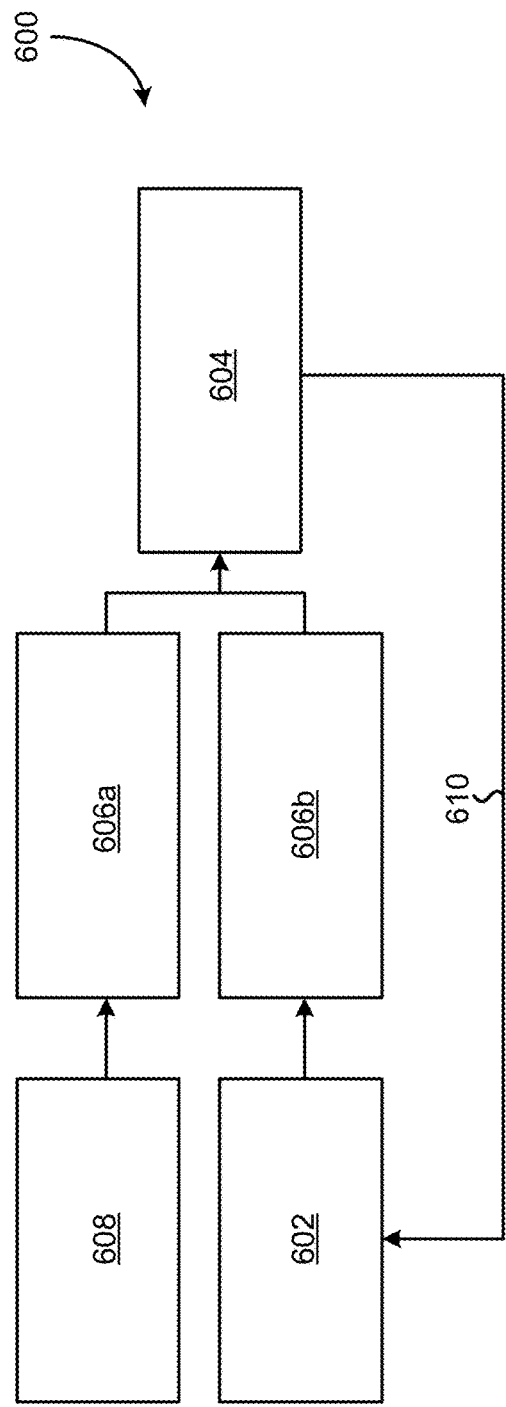

FIG. 6

ACTIVE IMITATION LEARNING IN HIGH DIMENSIONAL CONTINUOUS ENVIRONMENTS

BACKGROUND

The present invention relates to imitation learning, and more specifically, this invention relates to improved imitation learning using an active learning engine to minimize the need for expert trajectories (training data) in imitation learning applications.

Imitation learning (IL) is a type of reinforcement learning (RL), which involves agents interacting with an environment in order to learn an optimal policy for sequential decision making. The policy can be expressed as a sequence of state/action pairs, where each pair defines an action to be taken in response to experiencing a particular state (e.g. location, stimulus, etc.).

In traditional reinforcement learning, a reward or cost function describes how well the agent performs in a given state by receiving a reward or punishment signal. The policy seeks to identify actions, more specifically sequences of actions, which maximize the expected cumulative reward, or minimize the expected cumulative punishment. However, in highly dynamic environments, e.g. driving a car, learning to navigate a crowded or dynamically changing space, appropriate reward/cost functions are difficult to define because the criteria for success/failure at each possible state are not well understood and/or too complex to accurately model. For instance, it is difficult to quantify a given reward associated with turning a steering wheel a particular number of degrees in a particular direction.

Accordingly, imitation learning provides an alternative approach whereby trusted expert actors demonstrate appropriate actions for each state in the policy. Examples of existing applications for imitation learning include autonomous vehicles, which learn in part from the human driver during testing/training; healthcare assistance tools trained to imitate doctors, robotic arms trained to grasp and handle various objects by observing humans performing the same tasks, smart appliances observing patterns in human use/behavior (e.g. a thermostat or other Internet of Things (IoT) device).

While generally effective, generating policies using imitation learning is very expensive due to reliance on the expert actors. Furthermore, where expert decisions are non-deterministic (i.e. stochastic, where each action may be associated with a probability of occurring), imitation learning may require a large corpus of expert training examples to develop an appropriate policy. Further still, decision spaces for certain activities may be or include non-discrete dimensions (i.e. may be continuous, such as is the case for steering angle in the context of autonomous vehicles) and/or have a high dimensionality (e.g. hundreds to thousands of dimensions as opposed to only several (e.g. 3-30) in traditional applications). All these challenges cumulatively render imitation learning unsuitable for complex applications such as navigating through a complex, dynamic space.

Generative Adversarial Imitation Learning (GAIL) is a variety of imitation learning that pits a generator deep neural network against a discriminator deep neural network. The generator attempts to learn a policy, i.e. a mapping between states and actions of a decision space. The discriminator is a binary classifier that attempts to distinguish between expert-generated trajectories (training data) from test trajectories generated by the generator in the course of learning a given policy.

The generator and discriminator are trained in tandem through an iterative process that terminates when the policy generated by the generator converges with the expert trajectories, such that the discriminator can no longer distinguish between expert trajectories and generated trajectories. While GAIL represents a useful approach to imitative learning, a large amount of training data is required to generate appropriate policies, and the amount of training data increases rapidly with the complexity of the task (e.g. with greater dimensionality, non-discrete actions, and non-determinative action states). Given the expense associated with obtaining expert trajectories, applying GAIL to complex decision spaces is an undesirable approach.

Accordingly, what is needed is an active imitation learning method to improve the process of learning decision-making policies, and particularly to provide active imitation learning techniques capable of learning such policies with minimal expert interaction (training data) even in the context of high-dimensional, continuous environments.

SUMMARY

According to one embodiment, a computer-implemented method for active, imitation learning, includes: providing training data to a processor, where the training data comprises an expert trajectory, and the expert trajectory includes a plurality of state/action pairs; querying the expert trajectory during an iterative, active learning process to determine an optimal action to be taken in response to a given state, where the expert trajectory is queried for only a subset of iterations of the iterative, active learning process; generating a decision policy based at least in part on the expert trajectory and a result of querying the expert trajectory during the iterative, active learning process; attempting to distinguish the decision policy from the expert trajectory; in response to distinguishing the decision policy from the expert trajectory, outputting a policy update and generating a new decision policy based at least in part on the policy update; and in response to not distinguishing the decision policy from the expert trajectory, outputting the decision policy.

According to another embodiment, a computer program product for active imitation learning includes: a computer readable storage medium having program instructions embodied therewith, where the computer readable storage medium is not a transitory signal per se, and the program instructions are executable by a processor to cause the processor to perform a method. The method includes: providing, to the processor, training data to a processor, where the training data comprises an expert trajectory, and the expert trajectory includes a plurality of state/action pairs; querying, using the processor, the expert trajectory during an iterative, active learning process to determine an optimal action to be taken in response to a given state, where the expert trajectory is queried for only a subset of iterations of the iterative, active learning process; generating, using the processor, a decision policy based at least in part on the expert trajectory and a result of querying the expert trajectory during the iterative, active learning process; attempting to distinguish, using the processor, the decision policy from the expert trajectory; in response to distinguishing the decision policy from the expert trajectory, outputting a policy update and generating a new decision policy based at least in part on the policy update; and, in response to not distinguishing the decision policy from the expert trajectory, outputting the decision policy.

According to yet another embodiment, a system includes a processor; and logic integrated with the processor, executable by the processor, or integrated with and executable by the processor. The logic is configured to: provide training data to the processor, the training data comprising an expert trajectory, wherein the expert trajectory comprises a plurality of state/action pairs; query, using the processor, the expert trajectory during an iterative, active learning process to determine an optimal action to be taken in response to a given state, wherein the expert trajectory is queried for only a subset of iterations of the iterative, active learning process; generating, using the processor, a decision policy based at least in part on the expert trajectory and a result of querying the expert trajectory during the iterative, active learning process; attempting to distinguish, using the processor, the decision policy from the expert trajectory; in response to distinguishing the decision policy from the expert trajectory, output a policy update and generating a new decision policy based at least in part on the policy update; and in response to not distinguishing the decision policy from the expert trajectory, output the decision policy.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 illustrates a conventional Generative and Adversarial Imitation Learning (GAIL) Algorithm.

FIG. 4 depicts an inventive, Active GAIL algorithm for active, imitative learning, according to one embodiment.

FIGS. 5A-5C depict exemplary disagreement functions suitable for use in active learning, according to several embodiments.

FIG. 6 is a simplified schematic of an active imitation learning process, according to one embodiment.

DETAILED DESCRIPTION

Figure 1:
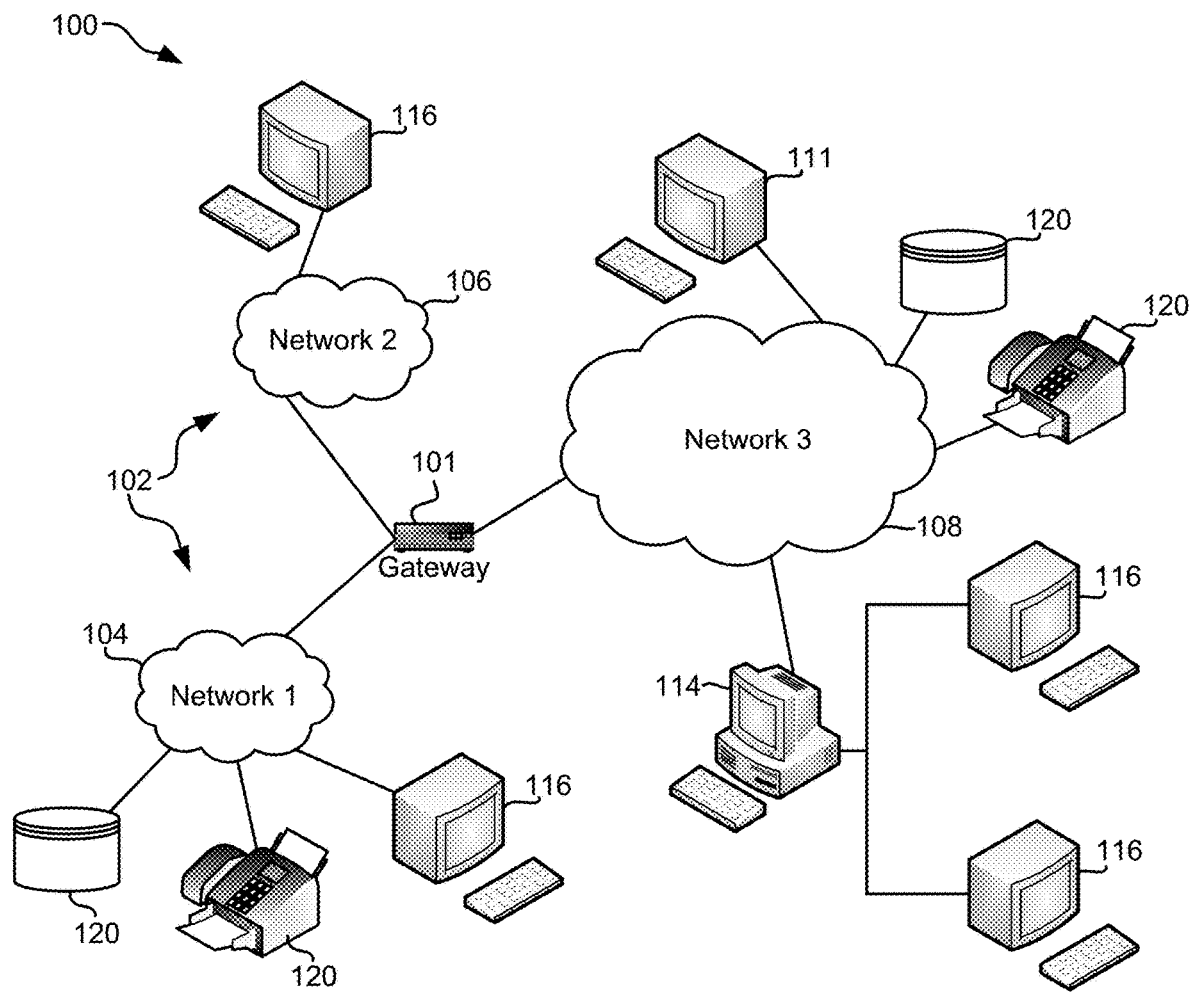
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for imitation learning, and more specifically, this invention relates to improved, active imitation learning using an active learning engine to minimize the need for expert trajectories (training data) in imitation learning applications.

According to one general embodiment, a computer-implemented method for active, imitation learning, includes: providing training data to a processor, where the training data comprises an expert trajectory, and the expert trajectory includes a plurality of state/action pairs; querying the expert trajectory during an iterative, active learning process to determine an optimal action to be taken in response to a given state, where the expert trajectory is queried for only a subset of iterations of the iterative, active learning process; generating a decision policy based at least in part on the expert trajectory and a result of querying the expert trajectory during the iterative, active learning process; attempting to distinguish the decision policy from the expert trajectory; in response to distinguishing the decision policy from the expert trajectory, outputting a policy update and generating a new decision policy based at least in part on the policy update; and in response to not distinguishing the decision policy from the expert trajectory, outputting the decision policy.

According to another general embodiment, a computer program product for active imitation learning includes: a computer readable storage medium having program instructions embodied therewith, where the computer readable storage medium is not a transitory signal per se, and the program instructions are executable by a processor to cause the processor to perform a method. The method includes: providing, to the processor, training data to a processor, where the training data comprises an expert trajectory, and the expert trajectory includes a plurality of state/action pairs; querying, using the processor, the expert trajectory during an iterative, active learning process to determine an optimal action to be taken in response to a given state, where the expert trajectory is queried for only a subset of iterations of the iterative, active learning process; generating, using the processor, a decision policy based at least in part on the expert trajectory and a result of querying the expert trajectory during the iterative, active learning process; attempting to distinguish, using the processor, the decision policy from the expert trajectory; in response to distinguishing the decision policy from the expert trajectory, outputting a policy update and generating a new decision policy based at least in part on the policy update; and, in response to not distinguishing the decision policy from the expert trajectory, outputting the decision policy.

According to yet another general embodiment, a system includes a processor; and logic integrated with the processor, executable by the processor, or integrated with and executable by the processor. The logic is configured to: provide training data to the processor, the training data comprising an expert trajectory, wherein the expert trajectory comprises a plurality of state/action pairs; query, using the processor, the expert trajectory during an iterative, active learning process to determine an optimal action to be taken in response to a given state, wherein the expert trajectory is queried for only a subset of iterations of the iterative, active learning process; generate, using the processor, a decision policy based at least in part on the expert trajectory and a result of querying the expert trajectory during the iterative, active learning process; attempt to distinguish, using the processor, the decision policy from the expert trajectory; in response to distinguishing the decision policy from the expert trajectory, output a policy update and generating a new decision policy based at least in part on the policy update; and in response to not distinguishing the decision policy from the expert trajectory, output the decision policy.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
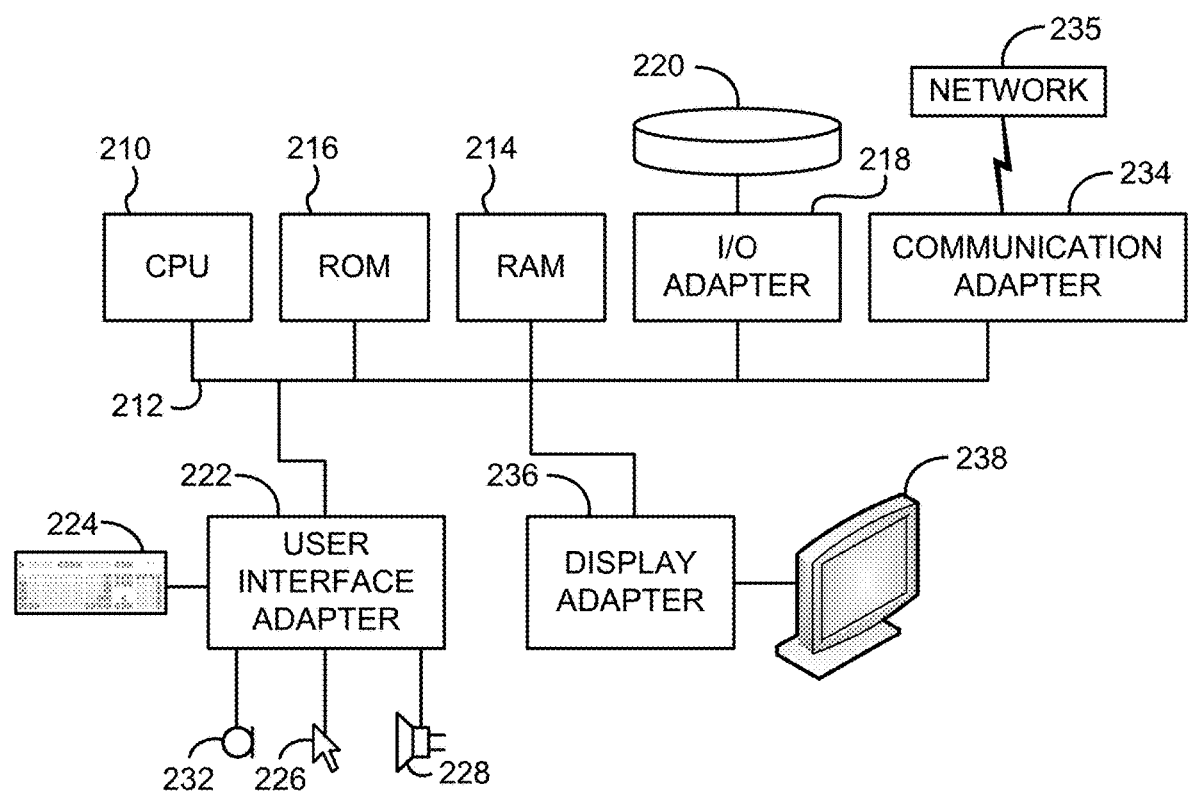
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

The present invention may be provided in the form of a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the presently disclosed systems and/or methodologies may be combined in any way, creating a plurality of combinations from the descriptions provided herein.

It will be further appreciated that embodiments of the presently described inventive concepts may be provided in the form of a service deployed on behalf of a customer to offer service on demand.

In general, the inventive concepts presented herein are directed to improved, active imitation learning technology capable of generating efficient, effective policies for complex decision spaces with minimal expert training. In one embodiment, an active learning engine queries expert trajectories only when facing particularly difficult decision points, rather than querying the expert trajectories for each decision point in the decision space/policy.

For example, in the context of a policy dictating how to ride a bicycle, a traditional imitation learning approach would query training data for every possible action that may be taken in response to every corresponding state. However, not all states and corresponding decisions are necessarily critical to the objective of riding the bicycle from point A to point B. Instead, a subset of critical states and associated actions may govern the performance of a given policy. For instance in the bicycle riding example, critical states may include an initial state (i.e. when the rider and bicycle are still) and associated action(s) (such as propelling the bicycle forward, turning handlebars, etc.), a final (or penultimate) state and associated action(s) (such as slowing/stopping the bicycle, turning handlebars, etc.), and one or more intermediate state(s) (e.g. representing particularly difficult turns on a course) may present the greatest challenge in optimizing a generated policy, so the active learning engine may query the training data for guidance at these points in the decision sequence. However, other states may have appropriate action(s) chosen without querying training data, and in such cases no training data query is performed. This reduces the overall complexity and computational cost of the policy learning process, such that effective policies may be generated much more quickly, using less resources, and represent an improvement to the functioning of computers employing imitation learning. Moreover, the optimal policy may be generated in fewer iterations because there are fewer points of training data to fit to the model (policy).

In one embodiment, the active learning engine of the presently described inventive concepts is a query-by-committee (QBC) approach to active learning, where a committee of simple prediction models are trained using the currently available expert training data. Thereafter, while the generator and discriminator of the imitation learning approach are trained in tandem, the expert trajectories are queried only for decision point(s) where the greatest disagreement exists among decisions made by the various members of the committee when trained on the expert training data alone.

Disagreement may be measured, in various embodiments, using any suitable technique such as generating confidence scores, uncertainty scores, or any other suitable method that would be appreciated by a person having ordinary skill in the art upon reading the present disclosures. In preferred approaches, however, disagreement is measured or determined using one or more disagreement functions selected from: an average coefficient of variation, a leave-one-out Mahalanobis distance, an average local outlier factor, a vote entropy, and/or any combination thereof. More preferably, average coefficient of variation, leave-one-out Mahalanobis distance, and average local outlier factor disagreement functions are applied where the action space (i.e. the decision space describing all possible actions that may be taken in response to all respective states in the policy) is continuous, while vote entropy is employed where the action space is discrete.

In one embodiment, an average coefficient of variation approach involves calculating variances of predictions (e.g., regression coefficients) made by the committee members, averaging across the output dimensions of the policy and normalizing by the mean to generate a weight for each output dimension.

In another embodiment, a leave-one-out Mahalanobis distance approach involves averaging a distance measure of each prediction vector (e.g., a vector of regression coefficients) generated by a given committee member to prediction vectors generated by the remaining committee members, e.g. a pairwise comparison of prediction vectors generated by a given committee member to all other committee members.

In yet another embodiment, an average local outlier factor approach involves measuring density of prediction vectors (e.g., vectors of regression coefficients), and identifying one or more decision points with relatively low local density compared to nearest neighboring decision points.

In still yet another embodiment, a vote entropy factor, may be employed to identify appropriate expert trajectory query points for a discrete action space.

According to a preferred embodiment, operational details of various disagreement functions in the context of an active imitative learning process are described in greater detail below and shown in FIGS. 5A-5C.

Now referring to FIG. 3, a conventional generative adversarial imitation learning algorithm is shown. The conventional algorithm shown in FIG. 3 lacks any active learning engine or associated functions as described herein and shown in FIGS. 4-6.

With reference now to FIG. 4 and Algorithm 1 as shown therein, an active-GAIL algorithm in accordance with the presently described inventive concepts includes the following features and operations.

The input to the algorithm includes: an initial set of labeled state-action pairs $L_0$, where $L_0$ is an initial set of trajectories of an initial policy, e.g. an initial policy generated based on training data, a first policy generated by generator, etc. in various embodiments. The input also includes: an initial policy parameter $\theta_0$; an initial discriminator parameter $w_0$; a predetermined or user-defined number of queries n per iteration i; a query interval q determining how frequently expert trajectories are queried; and a size threshold K of an unlabeled pool U (for discrete decision spaces) or unlabeled action vector pool A (for continuous decision spaces). For each type of decision space, it should be understood that in FIGS. 4-5C and corresponding descriptions, U is/may be substituted for A without departing from the scope of the inventive concepts described herein.

With continuing reference to Algorithm 1 as shown in FIG. 4, the active learning phase of the Algorithm is represented in lines 1-14. At initialization, a trajectory L is defined as the initial set $L_0$. For each iteration i of the algorithm, a determination is made (line 3) as to whether the iteration i shall involve querying expert trajectories, based on the respective values of i and q. For example, if i is any value other than a multiple of q, then no expert queries are sent. However, if i is a multiple of q, e.g. q=3 and i=3, or 6, or 9, or 12 . . . etc., n queries are sent to the expert for guidance.

Sending queries involves first determining whether a pool of unlabeled states U has a size |U| greater than or equal to a threshold size K of the unlabeled pool (line 5). As long as |U|<K, the generator is invoked and generates unlabeled states S based on a current policy $\hat{\pi}$ (line 6). The unlabeled pool U is then set, or redefined, as the union of U and the generated states S (line 7). This process of generating unlabeled states continues until |U|≥K.

Once |U|≥K, expert queries are performed for the set of labeled and unlabeled state-action pairs (L, U), based on the number of queries defined by the input parameter n (line 9). For each integer j, where j has a value from 1 . . . n, a next state s for which the expert trajectories are to be queried is provided/returned by the active learning engine ActiveLearner(L,U) (line 10). Each state s is preferably a state determined, using one or more of the disagreement functions described above and shown in FIGS. 4-6, to be a particularly difficult decision point within the decision space.

A decision point may be considered "particularly difficult" when a value of the disagreement measure/uncertainty measure generated by a given disagreement function exceeds a predetermined uncertainty threshold, in one approach. In another approach, a decision point may be considered "particularly difficult" based on having a maximum uncertainty measure value among all decision points in the training data, i.e., the labeled set of L. In any event, based on the query, an expert trajectory state label Label(s) corresponding to s (i.e. the expertly demonstrated action corresponding to the state s in the expert trajectories) is returned, and the set of labeled state-action pairs L is set/redefined as the union of L and the set of ordered pairs of states s and corresponding expert labels Label(s), i.e. L=L∪{(s, Label(s))} (line 11).

The set of labeled state-action pairs L is supplemented as described above in an iterative manner until j=n, at which point sample trajectories are fed to the discriminator to attempt to discriminate between the sample trajectories and expert trajectories. To the extent sample trajectories may be distinguished from the expert trajectories, the policy parameter θ is updated as shown in FIG. 4 (line 16). The discriminator functionality and corresponding policy update steps shown in lines 15-16 of Algorithm 1 proceed according to conventional GAIL.

The output of Algorithm 1 is an updated policy $\pi_{\theta i}$, which may be further updated/adjusted for any number of iterations i until a final policy $\hat{\pi}$, ideally a policy indistinguishable from that defined by the expert trajectories, is produced.

The overall operation of Algorithm 1 is an active learning process that over samples difficult decision points within an expert trajectory during training, and queries the expert trajectories less frequently while generating policies in the deep learning phase. The overall result is an improved imitation learning process, in the sense that problems characterized by high dimensionality, complex decision spaces (e.g. employing continuous, stochastic action states) can be modeled and solutions (trajectories) generated without requiring extensive expert training data. This means the inventive concepts described herein, by use of an active imitation learning procedure such as represented in lines 1-14 of Algorithm 1, are more efficient, both financially and computationally, since reliance on experts is minimized. For example, conventional GAIL will query the expert for much longer trajectories as the initial input to the iterative operations shown in lines 15-16 of Algorithm 1. Accordingly, conventional GAIL does not include any active learning step, and does not utilize any disagreement function or equivalent thereto in order to improve the policy generation.

Turning now to FIGS. 5A-5C, Applicant provides details regarding operation of several exemplary disagreement functions as invoked in line 10 of Algorithm 1, shown in FIG. 4.

In FIG. 5A, a Density Weighted Query By Committee (Density Weighted QBC) disagreement function is shown, according to one embodiment. The function initiates with an empty set or committee of decision trees C={ }. The function learns a number T of decision trees, by iteratively performing a bootstrap sampling of the training set L to obtain a modified training set L'. A given committee member c is defined by a decision tree learned based on L'.

The details of the decision tree learning process are beyond the scope of the present disclosure, but may include any decision tree learning process that would be appreciated by a person having ordinary skill in the art as suitable in the context of the presently described inventive concepts, once having read the present Specification in view of the various Figures. At any rate, the committee C is redefined/set to include the new committee member and all previous committee members $c_i$ generated during the iterative learning process for i=1 . . . T. In other words, C=C∪$c_i$ for i=1 . . . T, or more generally C=C∪c.

Having the committee C, the Density Weighted QBC function shown in FIG. 5A proceeds to determine, or estimate, density of various states s in unlabeled pool U. As understood herein, the "density" of a given state is synonymous with the frequency of a given state appearing in the corresponding set, e.g. preferably U or A. Density may be estimated, in various embodiments, using any suitable function known to those having ordinary skill in the art, and in one approach involves a simple count of each state s present in U. In addition to determining density, the Density Weighted QBC function determines disagreement between committee members c in C, and finds the most difficult decision point s* based on the density of the state s and disagreement between various committee members c in C. The output of the Density Weighted QBC function is the state s*, which is selected for expert query.

In FIG. 5B, a Vote Entropy disagreement function is shown, according to one embodiment. The Vote Entropy disagreement function operates best in discrete action spaces (i.e. non-continuous). Committee members c in C vote for complexity/entropy of various states in a discrete action space, and a dividend between the number of votes V for each label $y_i$ and a number of committee members |C| is multiplied by a base 10 logarithm of the same to obtain an entropy value for label $y_i$. The Vote Entropy disagreement function returns a negative sum over i of the entropy values for all labels $y_i$, i.e.—$\Sigma_i[(V(y_i)/|C|)\log(V(y_i)/|C|)]$.

In FIG. 5C, an Average Coefficient of Variation disagreement function is shown, according to one embodiment. The Average Coefficient of Variation function works best in continuous action spaces with $D_y$ dimensions, and involves computing a normalized measure of variance in predictions by committee C, then averaging across output dimensions $D_y$. In one embodiment, Average Coefficient of Variation function involves computing an average coefficient characterized by the expression $(1/D_y)\Sigma^{Dy}_{i=0}(\sigma^i/|\mu^i|)$. Moreover, as represented in FIG. 5C, {$\mu^{(i)}, \sigma^{(i)}$} are the mean and standard deviation of output dimension i across models in C applied to point s. This measure can be interpreted as the average variation in predictions made on point s by models in the committee, where the average is taken across committee members and the variance has been normalized in order to give equal weight to each output dimension. Generally, the average coefficient of variation (CV) is highest when predictions made by the committee models vary widely in many output dimensions, and lowest when the committee models output identical predictions across all output dimensions.

Of course, as would be understood by those having ordinary skill in the art upon reading the present disclosures, other disagreement functions besides those shown in FIGS. 5A-5C may be employed without departing from the scope of the presently described inventive concepts. However, in preferred embodiments, any combination of the foregoing may be employed for active learning purposes to improve an imitation learning technique such as conventional GAIL.

FIG. 6 shows a simplified schematic of a system 600 for active imitation learning, according to one embodiment of the presently disclosed inventive concepts. As shown in FIG. 6, the various components may be implemented as hardware or software, or combinations thereof. In principle, the system 600 includes a generator 602 and discriminator 604 which, in an adversarial manner, train a policy to a particular application or real-world problem such as navigating through a crowded, dynamic space, manipulating an object, performing a decision process, etc. as would be understood by those having ordinary skill in the art upon reading the present descriptions.

The generator 602 generates "sample trajectories" 606b or estimates sequences of decisions (state/action pairs) in the form of a policy to guide an actor through a complex decision space. The discriminator 604 is a binary classifier trained to distinguish the sample trajectories generated by generator 602, if possible, from "expert trajectories" 606a corresponding to actions demonstrated by an expert actor in response to being presented a particular state. The expert trajectories 606a may be equivalently considered trusted training data in the context of the system 600 performing imitative learning for a given task.

In an iterative fashion, the generator generates a policy (sample trajectory), which is passed to the discriminator along with expert trajectories for comparison/contrast as described hereinabove. Where a difference between expert trajectories 606a and sample trajectories 606b is determined, discriminator 604 outputs a policy update 610, e.g. in the form of a shift in a policy parameter θ, which is fed back into the generator 602 for the next iteration of policy generation.

Importantly, system 600 includes an active learning engine 608 that improves upon the adversarial process employed by the generator 602 and discriminator 604 in the manner described hereinabove. In brief, the active learning engine 608 identifies decision points within the decision space for which the policy is being developed, the decision points being the most difficult to resolve using conventional learning, even conventional imitative learning.

In preferred approaches, the active learning engine 608 employs one or more disagreement functions such as described hereinabove to identify decision points where various expert trajectories have the greatest disagreement about the proper action to take in response to a given state within the decision space. The disagreement may be determined according to various measures described herein and equivalents thereof that would be appreciated by a person having ordinary skill in the art upon reading the instant descriptions.

Details of the active learning engine, its constituent components/functions/modules, and interaction with the system 600 are provided above with reference to FIGS. 4-5C, in accordance with various embodiments of the inventive concepts described herein.

Figure 7:
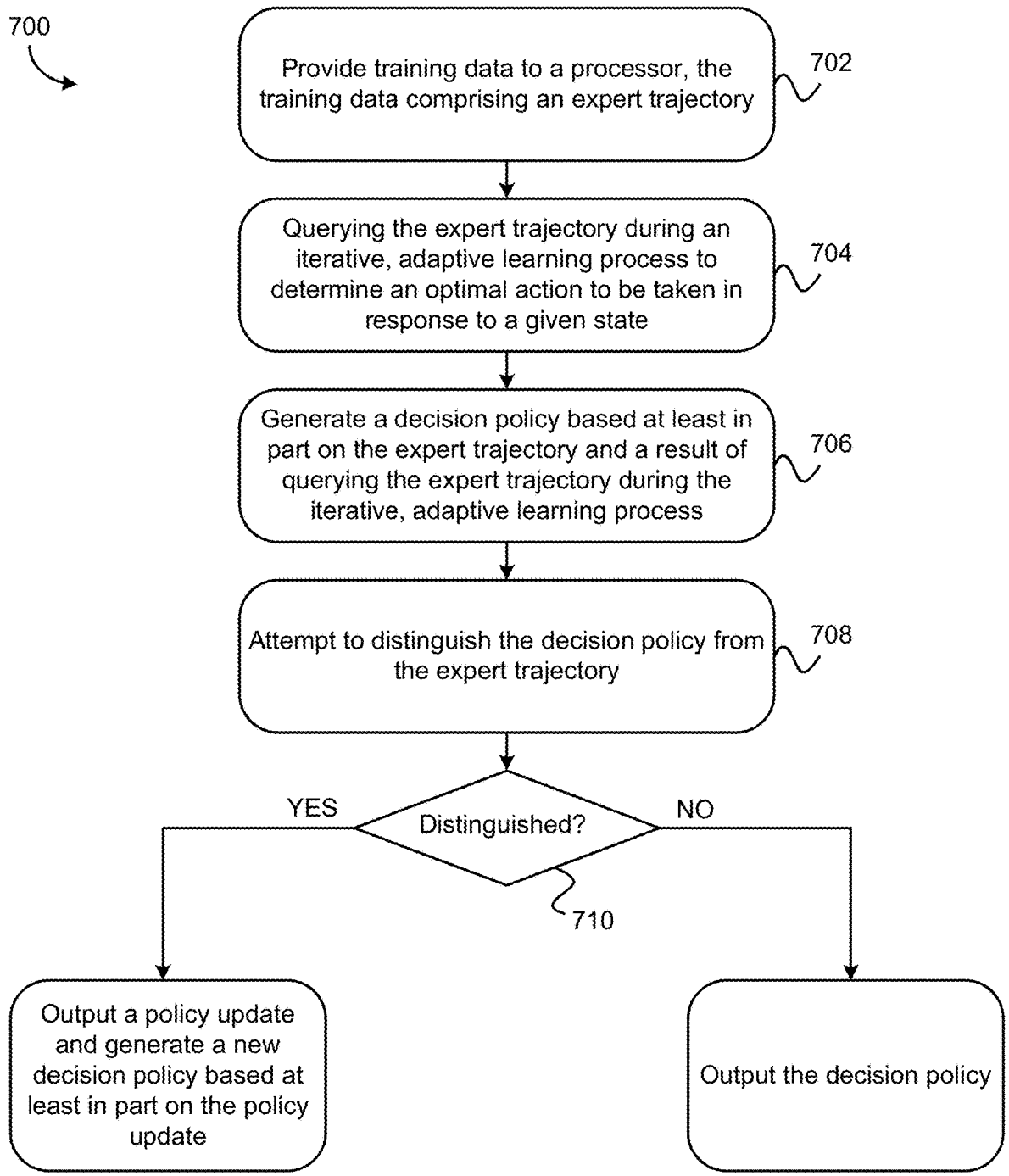
FIG. 7 is a flowchart of a method, according to one embodiment.

Now referring to FIG. 7, a flowchart of a method 700 for active, imitation learning is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a computing device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where training data are provided to a processor. The training data include at least one expert trajectory, and each expert trajectory comprises a plurality of state/action pairs corresponding to a decision space having a plurality of states and associated actions, which may be discrete or continuous, deterministic or stochastic, and have high dimensionality, e.g. on the order of several hundred to several thousand dimensions for each of an observation space describing all possible states of the decision space, and an action space describing all possible actions within the decision space. The expert trajectory or trajectories will be used to develop a decision policy with minimal reliance thereupon, e.g. as described hereinabove inter alia with respect to FIGS. 4-6.

In operation 704, the expert trajectory is queried at least once during an iterative, active learning process, so as to determine an optimal action to be taken in response to a given state in the decision space. Importantly, the expert, or the expert trajectory, is queried for only a subset of iterations of the iterative, active learning process, providing improved efficiency both in terms of financial and computational cost of performing imitative learning. Preferably, the result of querying the expert trajectory is a most uncertain state/action pair from the expert trajectory, though multiple uncertain state/action pairs from multiple expert trajectories may be employed, in various embodiments and without departing from the scope of the presently disclosed inventive concepts.

In operation 706, a decision policy is generated based at least in part on the expert trajectory and a result of querying the expert trajectory during the iterative, active learning process. The decision policy is preferably generated by a generator as described herein, e.g. discriminator 602 as shown in FIG. 6.

Preferably using a discriminator, e.g. which may be a binary classifier such as discriminator 604 as shown in FIG. 6, operation 708 of method 700 includes attempting to distinguish the generated decision policy from the expert trajectory provided as input. The distinction may be performed using any suitable technique, such as lines 4 and 5 of a conventional GAIL algorithm as shown in FIG. 3, or equivalently as shown in lines 15-16 of an Active GAIL algorithm as shown in FIG. 4.

In operation 710, in response to distinguishing the decision policy from the expert trajectory, a policy update is output, e.g. to the generator 602, and a new decision policy generated based at least in part on the policy update. Otherwise, in response to not distinguishing the decision policy from the expert trajectory, the decision policy is output as the expert trajectory and decision policy have converged. In this manner, method 700 represents an evolving, adversarial technique for imitation learning using deep neural networks. Advantageously, by sampling/querying expert trajectories on a limited basis only, the inventive techniques described herein improve the ability to resolve difficult decision points since these are over-sampled from within the expert trajectory, and performance of the algorithm is improved in terms of execution time and computational cost. The process of modeling/adapting generated policies to training data is much simpler because the number of queries/decisions that must be optimized is minimized, i.e. to those decision points that generate the most disagreement by disagreement functions or equivalents thereof that would be appreciated by a person having ordinary skill in the art upon reading the instant disclosure.

As shown in FIG. 7, method 700 includes operations 702-710, but it should be appreciated that in various embodiments, method 700 may include any combination or permutation of additional and/or alternative features, including but not limited to those shown in FIGS. 4-6 and corresponding descriptions provided hereinabove.

For example, in one embodiment, generating the decision policy includes a stochastic process. Moreover, generating the decision policy and/or attempting to distinguish between the expert trajectory and the decision policy may each be independently performed using different deep learning neural networks, such as the generator 602 and discriminator 604 as shown in FIG. 6.

In more approaches, the expert trajectory and the decision policy may each include a plurality of state/action pairs corresponding to a decision space, where at least one of the state/action pairs comprise a continuous state; and at least one of the state/action pairs comprises a non-deterministic action. For example, various dimensions of the decision space may include continuous observation dimensions, and/or continuous action dimensions, where the observed state and corresponding action are each non-discrete and exist along a continuum or spectrum of possible states/actions. Similarly, observations and/or (to a greater extent) actions may be stochastic, such that in different iterations of implementing a decision policy, a user/actor may choose different actions in response to experiencing/encountering the same state. The stochastic actions/observations are preferably probabilistically defined in the decision policy.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for active, imitation learning, comprising:
    providing training data to a processor, the training data comprising an expert trajectory, wherein the expert trajectory comprises a plurality of state/action pairs;
    querying the expert trajectory during an iterative, active learning process to determine an optimal action to be taken in response to a given state, wherein the expert trajectory is queried every q iterations of the iterative, active learning process, and wherein q is a predefined query interval having an integer value greater than 1;
    generating a decision policy based at least in part on the expert trajectory and a result of querying the expert trajectory during the iterative, active learning process;
    attempting to distinguish the decision policy from the expert trajectory;
    in response to distinguishing the decision policy from the expert trajectory, outputting a policy update and generating a new decision policy based at least in part on the policy update; and
    in response to not distinguishing the decision policy from the expert trajectory, outputting the decision policy.

2. The computer-implemented method of claim 1, wherein attempting to distinguish between the expert trajectory and the decision policy is performed using a binary classifier.

3. The computer-implemented method of claim 1, wherein generating the decision policy includes a stochastic process, and wherein generating the decision policy and attempting to distinguish between the expert trajectory and the decision policy are each independently performed using different deep learning neural networks.

4. The computer-implemented method of claim 1, wherein the result of querying the expert trajectory is a most uncertain state/action pair from the expert trajectory, and wherein the active learning process comprises determining the most uncertain state/action pair from the expert trajectory using one or more disagreement functions.

5. The computer-implemented method of claim 4, wherein the one or more disagreement functions are selected from the group consisting of: a Density Weighted Query By Committee disagreement function, a Vote Entropy disagreement function, an Average Coefficient of Variation disagreement function, and combinations thereof.

6. The computer-implemented method of claim 1, wherein the expert trajectory and the decision policy each comprise a plurality of state/action pairs corresponding to a decision space,
    wherein at least one of the state/action pairs comprise a continuous state; and
    wherein at least one of the state/action pairs comprises a non-deterministic action.

7. A computer program product for active imitation learning, the computer program product comprising a computer readable storage medium having program instructions embodied therewith, wherein the computer readable storage medium is not a transitory signal per se, the program instructions executable by a processor, to cause the processor to perform a method comprising:
    providing, to the processor, training data, wherein the training data comprises an expert trajectory, and wherein the expert trajectory comprises a plurality of state/action pairs;
    querying, using the processor, the expert trajectory during an iterative, active learning process to determine an optimal action to be taken in response to a given state, wherein the expert trajectory is queried every q iterations of the iterative, active learning process, and wherein q is a predefined query interval having an integer value greater than 1;
    generating, using the processor, a decision policy based at least in part on the expert trajectory and a result of querying the expert trajectory during the iterative, active learning process;
    attempting to distinguish, using the processor, the decision policy from the expert trajectory;
    in response to distinguishing the decision policy from the expert trajectory, outputting a policy update and generating a new decision policy based at least in part on the policy update; and
    in response to not distinguishing the decision policy from the expert trajectory, outputting the decision policy.

8. The computer program product of claim 7, wherein attempting to distinguish between the expert trajectory and the decision policy is performed using a binary classifier.

9. The computer program product of claim 7, wherein generating the decision policy includes a stochastic process, and wherein generating the decision policy and attempting to distinguish between the expert trajectory and the decision policy are each independently performed using different deep learning neural networks.

10. The computer program product of claim 7, wherein the result of querying the expert trajectory is a most uncertain state/action pair from the expert trajectory, and wherein the active learning process comprises determining the most uncertain state/action pair from the expert trajectory using one or more disagreement functions.

11. The computer program product of claim 10, wherein the one or more disagreement functions are selected from the group consisting of: a Density Weighted Query By Committee disagreement function, a Vote Entropy disagreement function, an Average Coefficient of Variation disagreement function, and combinations thereof.

12. The computer program product of claim 7, wherein the expert trajectory and the decision policy each comprise a plurality of state/action pairs corresponding to a decision space, wherein at least one of the state/action pairs comprise a continuous state; and wherein at least one of the state/action pairs comprises a non-deterministic action.

13. A system, comprising:

a processor; and logic integrated with the processor, executable by the processor, or integrated with and executable by the processor, the logic being configured to:

provide training data to the processor, the training data comprising an expert trajectory, wherein the expert trajectory comprises a plurality of state/action pairs;

query, using the processor, the expert trajectory during an iterative, active learning process to determine an optimal action to be taken in response to a given state, wherein the expert trajectory is queried every q iterations of the iterative, active learning process, and wherein q is a predefined query interval having an integer value greater than 1;

generate, using the processor, a decision policy based at least in part on the expert trajectory and a result of querying the expert trajectory during the iterative, active learning process;

attempt to distinguish, using the processor, the decision policy from the expert trajectory;

in response to distinguishing the decision policy from the expert trajectory, output a policy update and generating a new decision policy based at least in part on the policy update; and in response to not distinguishing the decision policy from the expert trajectory, output the decision policy.

14. The system of claim 13, wherein generating the decision policy includes a stochastic process, and wherein generating the decision policy and attempting to distinguish between the expert trajectory and the decision policy are each independently performed using different deep learning neural networks.

15. The system of claim 13, wherein the result of querying the expert trajectory is a most uncertain state/action pair from the expert trajectory, and wherein the active learning process comprises determining the most uncertain state/action pair from the expert trajectory using one or more disagreement functions.

16. The system of claim 15, wherein the one or more disagreement functions are selected from the group consisting of: a Density Weighted Query By Committee disagreement function, a Vote Entropy disagreement function, an Average Coefficient of Variation disagreement function, and combinations thereof.

17. The system of claim 13, wherein the expert trajectory and the decision policy each comprise a plurality of state/action pairs corresponding to a decision space, wherein at least one of the state/action pairs comprise a continuous state; and wherein at least one of the state/action pairs comprises a non-deterministic action.

* * * * *